US011480312B2

(12) United States Patent
Jars et al.

(10) Patent No.: US 11,480,312 B2
(45) Date of Patent: Oct. 25, 2022

(54) LIGHT EMITTING DEVICE FOR AN AUTOMOTIVE VEHICLE

(71) Applicant: VALEO VISION, Bobigny (FR)

(72) Inventors: Blais Jars, Bobigny (FR); Yves Gromfeld, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/426,222

(22) PCT Filed: Jan. 29, 2020

(86) PCT No.: PCT/EP2020/052186
§ 371 (c)(1),
(2) Date: Jul. 28, 2021

(87) PCT Pub. No.: WO2020/160982
PCT Pub. Date: Aug. 13, 2020

(65) Prior Publication Data
US 2022/0090754 A1  Mar. 24, 2022

(30) Foreign Application Priority Data
Feb. 4, 2019  (EP) .................................... 19155389

(51) Int. Cl.
*F21S 43/20* (2018.01)
*F21S 43/31* (2018.01)
(Continued)

(52) U.S. Cl.
CPC ............ *F21S 43/26* (2018.01); *B60Q 1/2607* (2013.01); *F21S 43/315* (2018.01);
(Continued)

(58) Field of Classification Search
CPC ................................ B60Q 1/2607; F21S 41/24
See application file for complete search history.

(56) References Cited

U.S. PATENT DOCUMENTS

| 4,733,335 A | 3/1988 | Serizawa et al. |
| 5,707,130 A | 1/1998 | Zwick et al. |
(Continued)

FOREIGN PATENT DOCUMENTS

| EP | 3179157 A1 | 6/2017 |
| JP | 2010212214 A | 9/2010 |
(Continued)

OTHER PUBLICATIONS

European Patent Office, International Search Report and Written Opinion of corresponding International Application No. PCT/EP2020/052186, dated Apr. 15, 2020.
(Continued)

*Primary Examiner* — Eric T Eide
(74) *Attorney, Agent, or Firm* — Valeo Vision (57) ABSTRACT

The present invention relates to a light emitting device having an optical part. The optical part comprises at least a first portion comprising a first light input face for receiving first light rays from a first light source and transmitting the first light rays directly toward a light output face so that the light exits the optical part. The optical part further comprises a second light input face for receiving second light rays light from a second light source and transmitting the second light rays toward said light output face so that they are reflected at least one time by total internal reflection on a first zone of said light output face before exiting the optical part through a second zone of said light output face.

20 Claims, 6 Drawing Sheets

(51) Int. Cl.
*B60Q 1/26* (2006.01)
*F21S 43/14* (2018.01)
*G02B 19/00* (2006.01)
*B60Q 3/64* (2017.01)

(52) U.S. Cl.
CPC ............ *G02B 19/0028* (2013.01); *B60Q 3/64* (2017.02); *F21S 43/14* (2018.01)

(56) References Cited

U.S. PATENT DOCUMENTS

| | | | |
|---|---|---|---|
| 2006/0083016 A1* | 4/2006 | Okamura | F21V 7/0091 362/245 |
| 2014/0160778 A1 | 6/2014 | Nakada | |
| 2016/0215950 A1 | 7/2016 | Ender et al. | |
| 2018/0302399 A1 | 10/2018 | Rabek et al. | |
| 2019/0118702 A1* | 4/2019 | Shikata | F21S 43/241 |
| 2019/0264886 A1* | 8/2019 | Sousek | F21S 43/31 |
| 2019/0275925 A1* | 9/2019 | Chen | F21S 43/30 |
| 2020/0200356 A1* | 6/2020 | Potter | F21S 43/26 |

FOREIGN PATENT DOCUMENTS

| | | |
|---|---|---|
| JP | 2013062074 A | 4/2013 |
| JP | 2014135142 A | 7/2014 |
| JP | 2015103328 A | 6/2015 |

OTHER PUBLICATIONS

European Patent Office, Communication Under Article 94(3) EPC cited in corresponding European Application No. 19155389.0-1012, dated Mar. 28, 2022.

\* cited by examiner

LIGHT EMITTING DEVICE FOR AN AUTOMOTIVE VEHICLE

CROSS-REFERENCE TO RELATED APPLICATIONS

This is a 371 application (submitted under 35 U.S.C. § 371) of International Application No. PCT/EP2020/052186 (WO2020/160982) filed on Jan. 29, 2020, which claims the priority date benefit of European Application No. EP19155389.0 filed on Feb. 4, 2019, the disclosures of which are hereby incorporated by reference in their entirety.

TECHNICAL FIELD

The present invention relates to a light emitting device for an automotive vehicle.

BACKGROUND

Light emitting devices for an automotive vehicle are placed on the exterior of automotive vehicles, especially for security purposes, to indicate to other road users the presence of the vehicle, as well as the intensions of the driver of the vehicle, such as breaking, changing the driving direction or reversing. Other devices are placed inside the vehicle to illuminate the passengers, to welcome them when they enter the vehicle, or to create a special ambiance light in the cabin.

More and more constraints apply to these devices. Car manufacturers have indeed increasing requirements in terms of homogeneity of their lit appearance. Moreover, the volumes available to install them in vehicles are more and more reduced, whether in thickness or width. In addition, such devices must be able to generate, on the same light emission surface, functions having a large light flux amplitude, and even several functions simultaneously emitting very different light fluxes.

However, the known light emitting devices, which have good homogeneity, are generally bulky. Conversely, those that are not bulky have a poor homogeneity. In addition, they are also poorly adapted to ensure a good homogeneity when they emit several light functions.

SUMMARY

An object of the present invention is to solve the disadvantages described above of known light emitting devices of an automotive vehicle. In particular, the object of the present invention is to provide a light emitting device, which is not bulky and can ensure a good homogeneity when it performs several lighting and/or signaling functions, for example, tail lighting function and turn indicator function.

The invention proposes a light emitting module comprising an optical part according to the invention.

More specifically the invention proposes an optical part for an automotive vehicle, comprising at least a first portion comprising a first light input face for receiving first light rays from a first light source and transmitting the first light rays directly toward a light output face so that the first light rays exits the optical part and at least a second portion comprising a second light input face for receiving second light rays from a second light source and transmitting the second light rays toward said light output face so that they are reflected at least one time by total internal reflection on a first zone of said light output face before exiting the optical part through a second zone of said light output face.

According to one non-limiting embodiment of the present invention, the at least second portion protrudes from the at least first portion.

According to one non-limiting embodiment of the present invention, the second light input face is situated at one extremity of the second portion that is protruded from the first portion.

According to one non-limiting embodiment of the present invention, the second light input face is flat.

According to one non-limiting embodiment of the present invention, the second light input face is curved and/or comports a collimator.

According to one non-limiting embodiment of the present invention, the first light input face is flat.

According to one non-limiting embodiment of the present invention, the first light input face is curved.

According to one non-limiting embodiment of the present invention, the first light input face comprises optical pattern, especially pillows and/or flutes and/or cones and/or a graining.

According to one non-limiting embodiment of the present invention, the first light input face comports hollow cones.

According to one non-limiting embodiment of the present invention, the cones have an apical angle comprised between 30° and 60°, and preferably an apical angle of 45° with respect to a respective axis of rotation of the cones.

According to one non-limiting embodiment of the present invention, the cones have a depth comprised between 0.15 and 0.3 mm, especially 0.2 mm.

According to one non-limiting embodiment of the present invention, the output face is curved.

According to one non-limiting embodiment of the present invention, the optical part comprises a plurality of first portions comprising each a first light input face and a plurality of second portions comprising each a second light input face.

According to one non-limiting embodiment of the present invention, the first input faces of the first portions form a connected surface.

According to one non-limiting embodiment of the present invention, the second portions are disjointed.

According to another embodiment of the present invention, the second portions are arranged in matrix.

According to another embodiment of the present invention, each second portions has a form of a cylinder or a cone.

According to another embodiment of the present invention, each second portions is rotationally symmetrical.

According to one non-limiting embodiment of the present invention, the output face comprises a plurality of curved portions.

According to one non-limiting embodiment of the present invention, the output face comprises a plurality of hollow portions.

According to one non-limiting embodiment of the present invention, the hollow portions are each rotationally symmetrical, especially have a conical form with an apex.

According to one non-limiting embodiment of the present invention, the generating curve of the conical form is curved.

According to one non-limiting embodiment of the present invention, the hollow portions are disjointed.

According to one non-limiting embodiment of the present invention, each hollow portions is opposite an associated second portion.

According to one non-limiting embodiment of the present invention, the apex of the conical form is centered on a central axis of its associated second portion.

According to one non-limiting embodiment of the present invention, the curved portions are arranged in a matrix, and alternating with the hollow portions.

In accordance with one non-limiting embodiment of the present invention, the light emitting module comprises an optical part according to the invention with at least a first light source placed opposite the first light input face of the at least first portion and at least a second light source placed opposite the second light input face of the at least second portion.

In accordance with another embodiment of the present invention, the light emitting module comprises an optical part according to the invention and comprising a plurality of first portions and a plurality of second portions, a plurality of first light sources each opposite an associated first light input face of a first portion, and a plurality of second light sources each opposite an associated second light input face of a second portion.

According to one non-limiting embodiment of the present invention, each first light input face is associated to a first light source.

According to one non-limiting embodiment of the present invention, each second input face is associated to a second light source.

According to one non-limiting embodiment of the present invention, the plurality of first light sources and the plurality of second light sources are semi-conductor light sources, especially light emitting diodes.

According to one non-limiting embodiment of the present invention, the plurality of first light sources is adapted to emit a light flux different from the light flux emitted by the plurality of second light sources.

According to one non-limiting embodiment of the present invention, the plurality of first light sources and the plurality of second light sources are configured for emitting a light color chosen from red, amber, yellow or white.

According to one non-limiting embodiment of the present invention, the plurality of first light sources is adapted to emit a light color different from the light color emitted by the plurality of second light sources.

According to one non-limiting embodiment of the present invention, the plurality of first light sources are disposed on a common support.

According to one non-limiting embodiment of the present invention, the plurality of second light sources are disposed on a common support.

According to one non-limiting embodiment of the present invention, the plurality of first light sources and the plurality of second light sources are disposed on a common support.

The present invention also proposes, a light emitting device comprising a housing comporting a front opening, and at least one light emitting module according to the invention placed in the housing.

According to one non-limiting embodiment of the present invention, the light emitting device further comprises an outer lens closing the front opening of the housing, the at least one light emitting module being placed in the volume formed by the housing and the outer lens.

According to one non-limiting embodiment of the present invention, the light emitting device is a rear lamp, a headlamp, or an internal lighting device, of an automotive vehicle.

According to one non-limiting embodiment of the present invention, the light emitting device is an internal lighting device of an automotive vehicle, the optical part closing the front opening of the housing.

Thus, the present invention is to provide a light emitting device, which is not bulky and can ensure a good homogeneity when it emits several light functions.

BRIEF DESCRIPTION OF THE DRAWINGS

To complete the description and to provide a better understanding of the invention, a set of drawings is provided. Said drawings form an integral part of the description and illustrate an embodiment of the invention, which should not be construed as restricting the scope of the invention, but only as an example of how the invention can be carried out. The drawings comprise the following characteristics.

DETAILED DESCRIPTION

Hereinafter, embodiments of the present invention will be described with reference to the accompanying drawings.

The present invention provides a light emitting device, which ensures a good homogeneity when it emits several lighting and/or signaling functions, for example, tail function and turn indicator function, tail function and stop function, position or parking function and DRL (for "Daytime Running Lamp") function, position or parking function and turn indicator function.

Figure 1A:
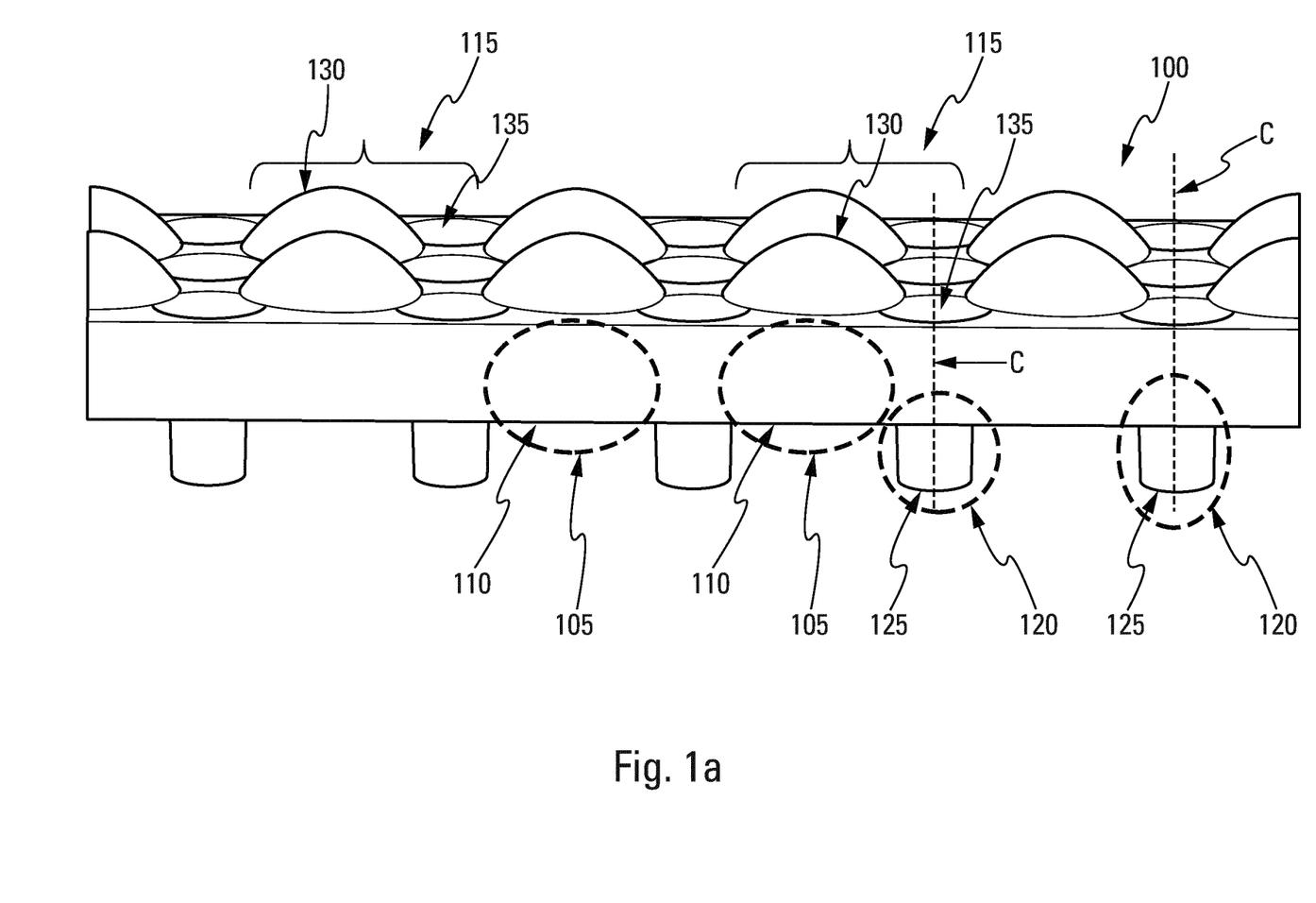
FIG. 1a shows a perspective view of an optical part, according to an embodiment of the present invention.
Figure 1B:
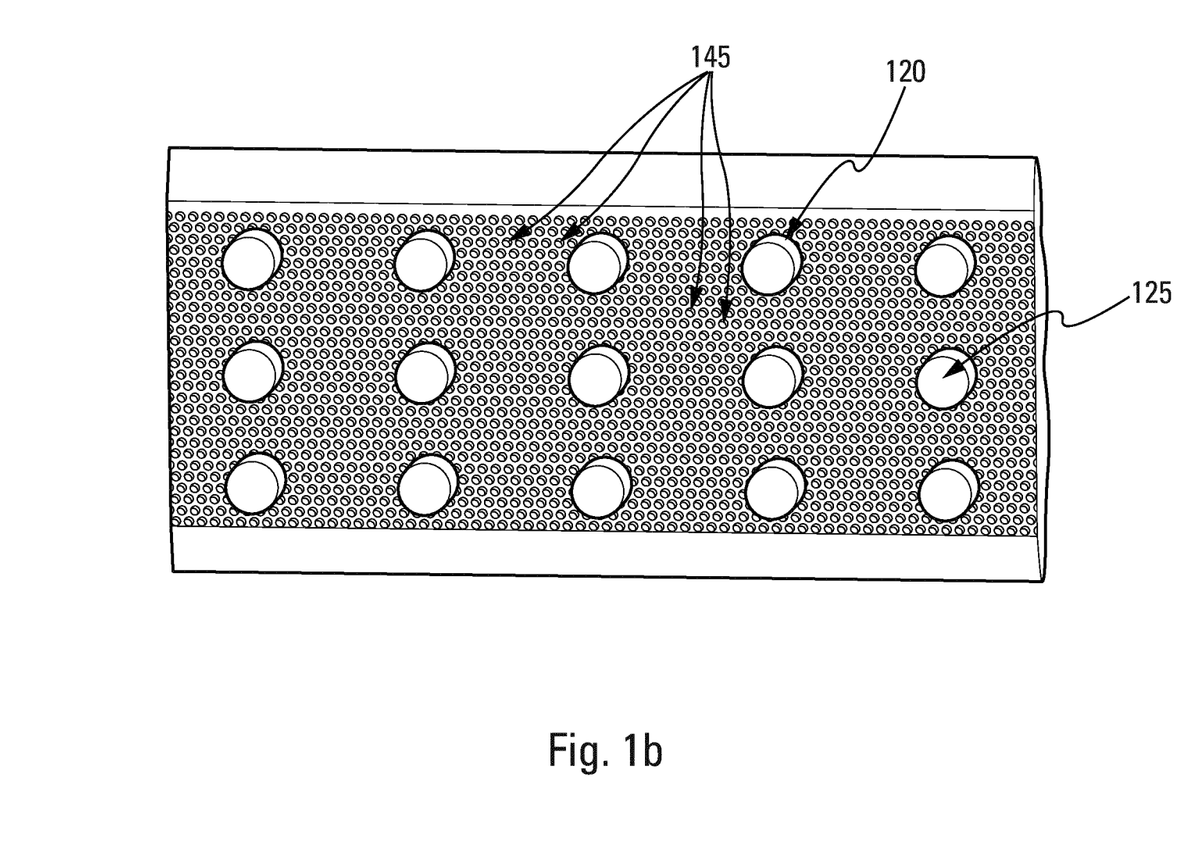
FIG. 1b shows a bottom view of the optical part of the FIG. 1a, according to an embodiment of the present invention.
Figure 1C:
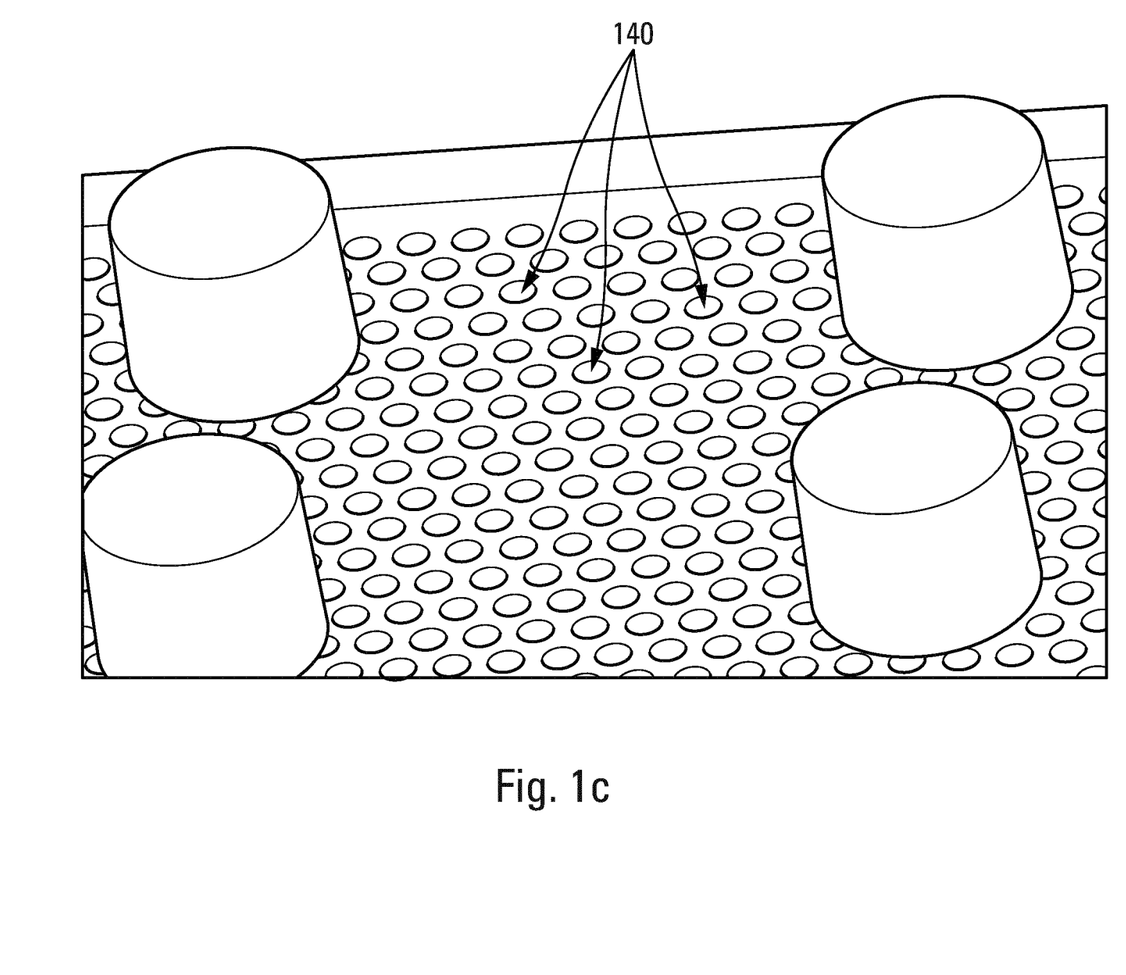
FIG. 1c shows enlarged view of the bottom portion of the optical part shown in the FIG. 1b, according to an embodiment of the present invention.
Figure 1D:
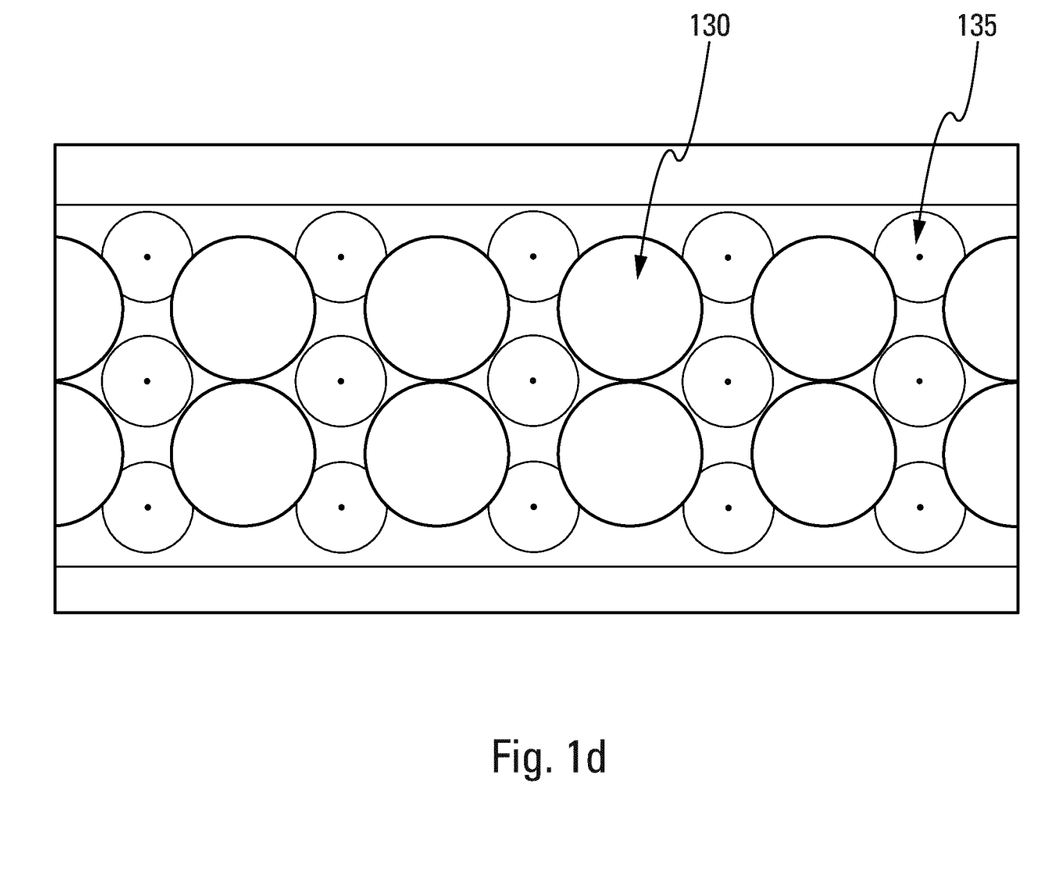
FIG. 1d shows a top view of the optical part of the FIG. 1a, according to an embodiment of the present invention.

FIG. 1a shows a perspective view of an optical part of a light emitting device, according to an embodiment of the present invention. FIG. 1b shows a bottom view of the optical part of the FIG. 1a, according to an embodiment of the present invention. FIG. 1c shows enlarged view of the bottom portion of the optical part shown in the FIG. 1b, according to an embodiment of the present invention. FIG. 1d shows a top view of the optical part of the FIG. 1a, according to an embodiment of the present invention.

In accordance with an embodiment of the present invention, the optical part 100 of an automotive vehicle comprises at least a first portion 105 comprising a first light input face 110 for receiving first light rays from a first light source 205 (shown in the FIG. 2) and transmitting first light rays directly toward a light output face 115, so that the first light rays exit the optical part 100. The optical part 100 further comprises at least a second portion 120 comprising a second light input face 125 for receiving second light rays from a second light source 210 (shown in the FIG. 2) and transmitting the second light rays toward the light output face 115 so that the second light rays are reflected at least one time by total internal reflection on a first zone 215 (shown in the FIG. 2) of the light output face 115 before exiting the optical part 100 through a second zone 220 (shown in the FIG. 2) of the light output face 115. In one embodiment the light output face 115 is curve shaped.

As can be seen from the FIG. 1a, the at least second portion 120 of the optical part 100 protrudes from the at least first portion 105 of the optical part 100. Further, the at least a second portion 120 has a form of a cone or a cylinder. The second light input face 125 is situated at one extremity of the second portion 120 that is protruded from the first portion 105.

In an embodiment, the second light input face 125 may be flat shaped as shown in the FIG. 1a. In another embodiment, the second light input face may be curve shaped and/or comprise a collimator (not shown in the Figures) to collimate the light emitted from the second light source 210.

In an embodiment, the first light input face 110 may be flat shaped as shown in the FIG. 1a. In another embodiment, the first light input face 110 may be curve shaped and/or comprise a collimator (not shown in the Figures) to collimate the light emitted from the second light source 210. Further, the first light input face 110 may comprise optical patterns 145, which are clearly visible in the FIG. 1b. The optical patterns 145 may be pillows and/or flutes and/or cones and/or a graining.

Further, in an embodiment, the first light input face 110 may comprise hollow cones 140 as shown in the FIG. 1c. Each cone 140 has an apical angle or half-opening angle. The half-opening angle is between 30° and 60°, and preferably 45° with respect to an axis of rotation of the cone. Each cone 140 has a depth between 0.15 mm and 0.3 mm, especially 0.2 mm.

In accordance with another embodiment of the present invention, the optical part 100 comprises a plurality of first portions 105 and a plurality of second portions 120. Each first portion 105 comprises a first light input face 110 for receiving the first light rays from the first light source 205. Further, each second portion 120 comprises a second light input face 125 for receiving the second light rays from the second light source 210.

The first input faces 110 of the first portions 105 form a connected surface and the second portions 120 are disjointed. The second portions 120 may be arranged in matrix, which is a grid organized in rows and columns. Each second portion 120 has a shape of a cylinder or a cone, and each second portion 120 is rotationally symmetrical. In one embodiment all the second portions have the same shape.

In an embodiment, each first portion 105 can be associated to several second portions 120, i.e., the light coming from several second portions 120 can be directed to one given first portion output face 115.

The light output face 115 comprises a plurality of curved portions 130 and a plurality of hollow portions 135. Each hollow portion 135 is rotationally symmetrical, and especially have a conical form with an apex. Further, the hollow portions 135 of the output face 115 are disjointed as shown in the FIG. 1a. Each hollow portion 135 is opposite to an associated second portion 120 and an apex of the conical form of the hollow portion 135 is centered on a central axis 'C' of its associated second portion 120. Further, in an aspect, the curved portions 130 of the light output face 115 may be arranged in a matrix, and alternating with the hollow portions 135, as shown in the FIG. 1a.

Figure 2:
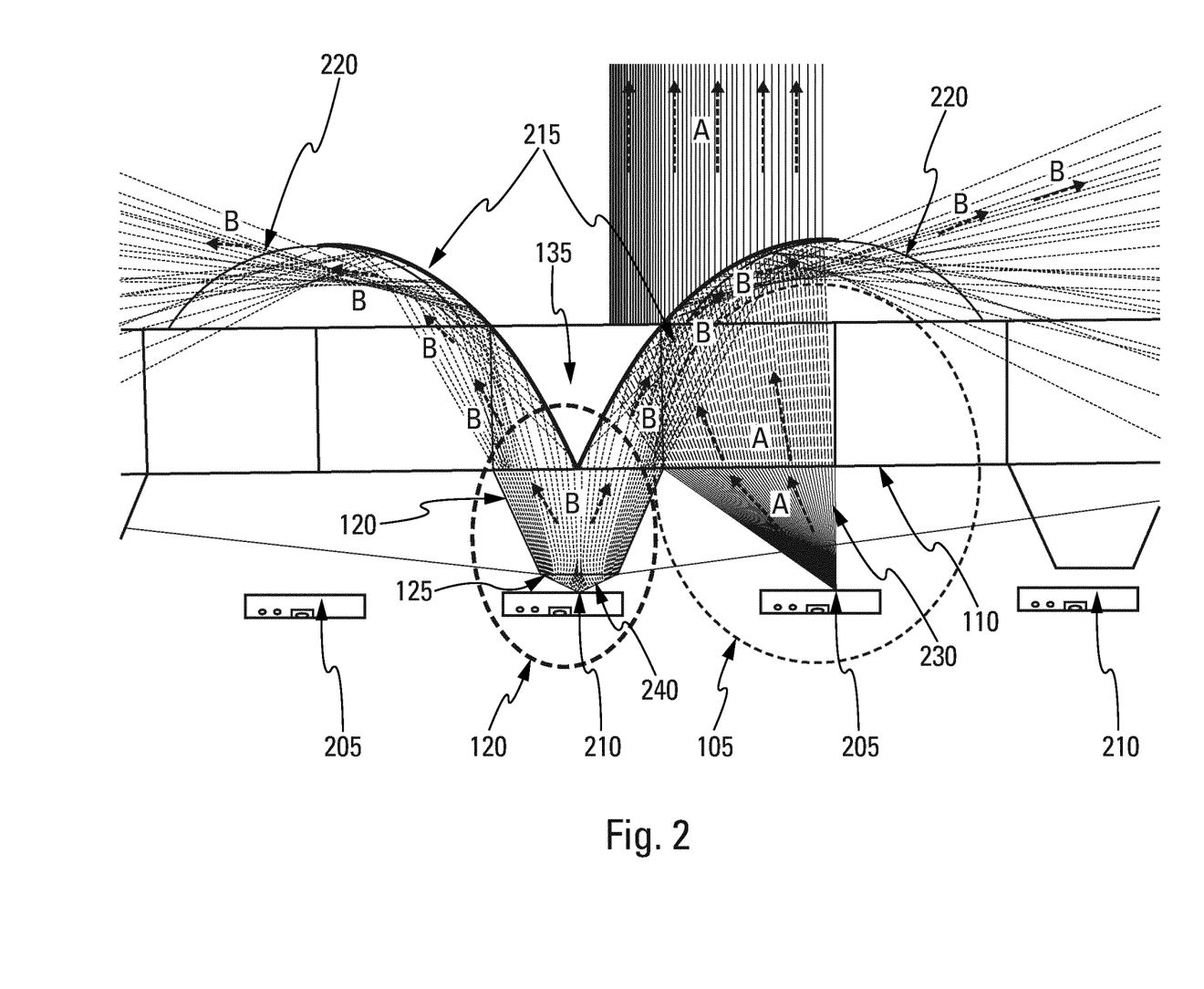
FIG. 2 is a sectional representation of an optical part shown in the FIG. 1a, according to an embodiment of the present invention.

The path of the light from the optical part 100 is explained with respect to the FIG. 2. FIG. 2 is a sectional representation of an optical part 100 shown in the FIG. 1a, according to an embodiment of the present invention. The section is obtained by a plane perpendicular to a global elongation plane of the optical part 100 and through the center of two second portions 120. As mentioned previously, the optical part 100 of the present invention ensure a good homogeneity when it emits several lighting and/or signaling functions, for example, tail lighting function and turn indicator function, tail function and stop function, position or parking function and DRL (for "Daytime Running Lamp") function, position or parking function and turn indicator function.

The plurality of first light sources 205 and the plurality of the second light sources 210 are configured for emitting a light color chosen from red, amber, yellow or white in order to perform several lighting and/or signaling functions. The purpose of emitting different colors for performing different lighting and/or signaling function is known to a person skilled in the art, and therefore not discussed in detail in this description.

The path of first light rays 230 emitted from the first light source 205 is indicated by dotted arrows A. It is to be noted that only half of the first light rays is shown in the FIG. 2 and FIG. 3b for the purpose of the clarity. However, the rays symmetric about a not represented vertical axis centered on the light source also exist. First light rays emitted from the first light source 205 enter into the optical part 100 through the first light input face 110 and are directly transmitted to the light output face 115, i.e., first light rays exit the optical part 100 from the curved portion 130 of the light output face 115. Second light rays 240 emitted from the second light source 210 enter into the optical part 100 through the second light input face 125 and are transmitted towards first zones 215 of the light output face 115 through the second portion 120. From the second portion 120, transmitted second light rays meet the hollow portion 135 of the light output face 115 where they are reflected at least one time and exit the optical part 100 through the second zones 220 of the light output face 115. Dotted arrows B in the FIG. 2 show the path of second light rays emitted from the second light source 210. Thus, the proposed structure of the optical part 100 ensures that light from each light sources to flow homogenously.

Figure 3A:
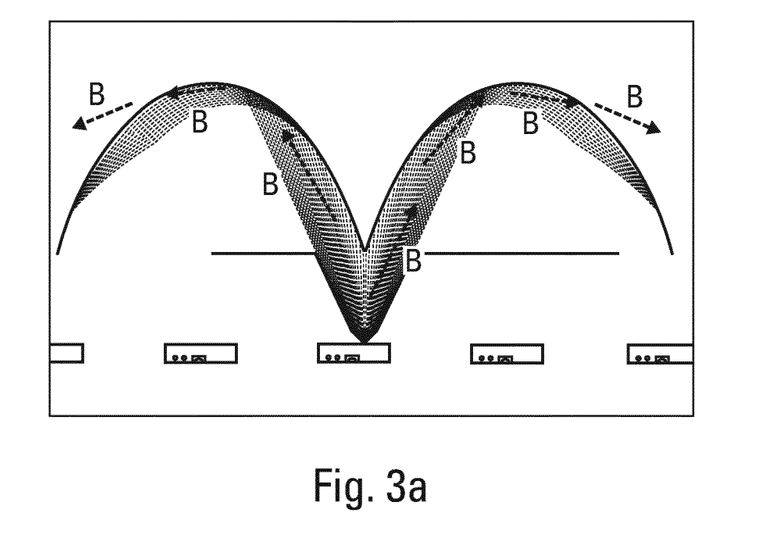
FIG. 3a is a representation of a first lighting/signaling function performed by the optical part of the FIG. 1a, in accordance with an embodiment of the present invention.
Figure 3B:
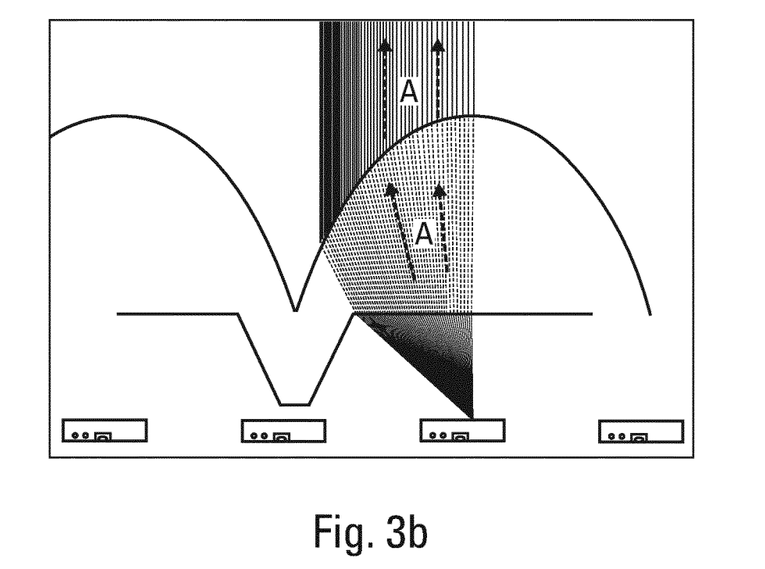
FIG. 3b is a representation of a second lighting/signaling function performed by the optical part of the FIG. 1a, in accordance with an embodiment of the present invention.

The path of the light rays emitted from the first light source 205 to perform the first lighting/signaling function and path of the light rays emitted from the second light source 210 to perform the second lighting/signaling function is separately shown in the FIG. 3a and the FIG. 3b. Therefore, in accordance with present invention, single optical part can be used to perform several lighting and/or signaling functions, rather than using several parts for performing several functions.

In accordance with another embodiment of the present invention, a light emitting module is disclosed. The light emitting module comprises an optical part 100 having at least one first portion 105 and at least one second portion 120, as mentioned in previously discussed embodiment. The light emitting module further comprises at least a first light source 205 placed opposite the first light input face 110 of the at least first portion 105. In addition, the light emitting module comprises a second light source 210 placed opposite the second light input face 125 of the at least second portion 120.

In accordance with another embodiment of the present invention, a light emitting module having a plurality of first portions 105 and a plurality of second portions 120 is disclosed. The light emitting module comprises a plurality of first light sources 205 each opposite an associated first light input face 110 of the first portion 105, and a plurality of second light sources 210 each opposite an associated second light input face 125 of the second portion 120. Each first portion 105 is associated to a first light source 205 and each second portion 120 is associated to a second light source 210.

The plurality of first light sources 205 and the plurality of the second light sources 210 are semi-conductor light sources, for example, light emitting diodes. Further, the plurality of first light sources 205 is adapted to emit a light flux different from the light flux emitted by the plurality of the second light sources 210. In addition, the plurality of first light sources 205 is adapted to emit a light color different from the light color emitted by the plurality of second light sources 210. In an aspect, the plurality of first light sources 205 are disposed on a common support, and the plurality of the second light sources 210 are disposed on another common support. In another aspect, both the plurality of first light sources 205 and the plurality of second light sources 210 are disposed on a single common support.

In accordance with an embodiment, the present invention discloses a light emitting device comprising a housing comprising an opening, and at least one light emitting module described in the above embodiments. The at least one light emitting module is placed in the housing. The light emitting device further comprises an outer lens closing the front opening of the housing, the at least one light emitting module being placed in the volume formed by the housing and the outer lens. The light emitting device may be either a rear lamp or a headlamp of the automotive vehicle. In an aspect, the light emitting device is an internal lighting device of the automotive vehicle, where the optical part closes the front opening of the housing.

The light emitting device of the present invention can perform several lighting and/or signaling functions using a single optical part, and therefore occupies less space compared to conventional light emitting devices.

What is claimed is:

1. An optical part for an automotive vehicle, comprising:
    a plurality of first portions, each comprising a first light input face for receiving first light rays from a first light source and transmitting the first light rays directly toward a curved light output face so that the light exits the optical part, with the curved light output facing including a plurality of hollow portions; and
    a plurality of second portions, each comprising a second light input face for receiving second light rays light from a second light source and transmitting the second light rays toward the curved light output face so that the second light rays are reflected at least one time by total internal reflection on a first zone of the curved light output face before exiting the optical part through a second zone of the curved light output face.

2. The optical part according to claim 1, wherein the plurality of second portions protrude from the plurality of first portion.

3. The optical part according to claim 1, wherein the first light input face comprises an optical pattern.

4. The optical part according to claim 1, wherein the first input faces of the plurality of first portions form a connected surface.

5. The optical part according to claim 1, wherein the plurality of second portions are disjointed.

6. The optical part according to claim 1, wherein the plurality of second portions are arranged in matrix.

7. The optical part according to claim 1, wherein the curved light output face includes a plurality of curved portions.

8. The optical part according to claim 1, wherein the hollow portions are each rotationally symmetrical, especially have a conical form with an apex, wherein each hollow portions is opposite an associated second portion and the apex of the conical form is centered on a central axis of its associated second portion.

9. The optical part according to claim 1, wherein the curved light output face includes curved portions arranged in a matrix, with the curved portions alternating with the hollow portions.

10. A light emitting module comprising:
    an optical part with a plurality of first portions comprising each a first light input face for receiving first light rays and transmitting the first light rays directly toward a curved light output face so that the light exits the optical part and a plurality of second portions comprising each a second light input face for receiving second light rays light and transmitting the second light rays toward the curved light output face so that they are reflected at least one time by total internal reflection on a first zone of the curved light output face before exiting the optical part through a second zone of the curved light output face, with the curved light output face including a plurality of hollow portions;
    a plurality of first light sources each opposite an associated first light input face of a first portion; and
    a plurality of second light sources each opposite an associated second light input face of a second portion, with each first light input face associated to a first light source and each second light input face associated to a second light source.

11. The light emitting module according to claim 10, wherein the plurality of first light sources is adapted to emit a light flux different from the light flux emitted by the plurality of second light sources.

12. A light emitting device comprising:
    a housing comporting a front opening;
    at least one light emitting module placed in the housing, the at least one light emitting module comprising:
    a plurality of first portions, each comprising a first light input face for receiving first light rays from a first light source and transmitting the first light rays directly toward a curved light output face so that the light exits the optical part, with the curved light output face including a plurality of hollow portions; and
    a plurality of second portions comprising a second light input face for receiving second light rays light from a second light source and transmitting the second light rays toward the curved light output face so that the second light rays are reflected at least one time by total internal reflection on a first zone of the curved light output face before exiting the optical part through a second zone of the curved light output face.

13. The light emitting module according to claim 10, wherein the plurality of second portion protrude from the plurality of first portion.

14. The light emitting module according to claim 10, wherein the first input faces of the plurality of first portions form a connected surface.

15. The light emitting module according to claim 10, wherein the plurality of second portions are disjointed.

16. The light emitting module according to claim 10, wherein the plurality of second portions are arranged in matrix.

17. The light emitting module according to claim 10, wherein the hollow portions are each rotationally symmetrical, especially have a conical form with an apex, wherein each hollow portions is opposite an associated second portion and the apex of the conical form is centered on a central axis of its associated second portion.

18. The light emitting module according to claim 10, wherein the curved light output face includes curved portions arranged in a matrix, with the curved portions alternating with the hollow portions.

19. The light emitting device according to claim 12, wherein the hollow portions are each rotationally symmetrical, especially have a conical form with an apex, wherein each hollow portions is opposite an associated second portion and the apex of the conical form is centered on a central axis of its associated second portion.

20. The light emitting device according to claim 12, wherein the curved light output face includes curved portions arranged in a matrix, with the curved portions alternating with the hollow portions.

* * * * *